(12) United States Patent
Lee et al.

(10) Patent No.: US 7,733,344 B2
(45) Date of Patent: Jun. 8, 2010

(54) METHOD, MEDIUM AND APPARATUS RENDERING 3D GRAPHIC DATA USING POINT INTERPOLATION

(75) Inventors: Shin-jun Lee, Yongin-si (KR); Gyeong-ja Jang, Yongin-si (KR); Seok-yoon Jung, Yongin-si (KR); Alexei Sosnov, Yongin-si (KR); Do-kyoon Kim, Yongin-si (KR); Keun-ho Kim, Yongin-si (KR); Alexander Zhirkov, Moscow (RU); Alexander Parshin, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 550 days.

(21) Appl. No.: 11/717,185

(22) Filed: Mar. 13, 2007

(65) Prior Publication Data

US 2007/0211054 A1 Sep. 13, 2007

(30) Foreign Application Priority Data

Mar. 13, 2006 (KR) .................. 10-2006-0023207

(51) Int. Cl.
*G06T 15/00* (2006.01)
*G06T 11/20* (2006.01)
*G09G 5/02* (2006.01)
*G09G 5/00* (2006.01)
*G06K 9/00* (2006.01)
*G06K 9/40* (2006.01)
*G06K 9/32* (2006.01)

(52) U.S. Cl. .............. 345/427; 345/419; 345/589; 345/606; 345/443; 382/162; 382/254; 382/286; 382/300

(58) Field of Classification Search ......... 345/418–419, 345/426–427, 428, 581, 586, 589, 606, 441–443, 345/467–469, 643, 549, 619, 639; 382/162, 382/167, 254, 274, 276, 286, 300
See application file for complete search history.

(56) References Cited

U.S. PATENT DOCUMENTS

| | | | | |
|---|---|---|---|---|
| 5,341,468 | A * | 8/1994 | Shiraishi et al. | 345/581 |
| 7,009,622 | B2 * | 3/2006 | Shiraishi | 345/606 |
| 2001/0028350 | A1 * | 10/2001 | Matsuoka et al. | 345/427 |
| 2004/0150656 | A1 * | 8/2004 | Shiraishi | 345/606 |
| 2006/0087707 | A1 * | 4/2006 | Akaho | 358/518 |
| 2006/0244746 | A1 * | 11/2006 | England et al. | 345/419 |

FOREIGN PATENT DOCUMENTS

KR 2001-0047046 6/2001

OTHER PUBLICATIONS

Korean Patent Office Action, mailed Jan. 29, 2007, and issued in priority Korean Patent Application No. 10-2006-0023207.

* cited by examiner

*Primary Examiner*—Wesner Sajous
(74) *Attorney, Agent, or Firm*—Staas & Halsey LLP (57) ABSTRACT

A method and apparatus for rendering 3D graphic data is provided. The 3D graphic data is projected onto a 2D screen and points are interpolated and rendered, thereby quickly processing the 3D graphic data.

22 Claims, 11 Drawing Sheets
(6 of 11 Drawing Sheet(s) Filed in Color)

METHOD, MEDIUM AND APPARATUS RENDERING 3D GRAPHIC DATA USING POINT INTERPOLATION

CROSS-REFERENCE TO RELATED APPLICATIONS

This application claims the benefit of Korean Patent Application No. 10-2006-0023207, filed on Mar. 13, 2006, in the Korean Intellectual Property Office, the disclosure of which is incorporated herein in its entirety by reference.

BACKGROUND

1. Field

One or more embodiments of the present invention relate to 3-dimensional (3D) graphics, and more particularly, to a method and apparatus for rendering 3D graphic data as a 2D image.

2. Description of the Related Art

A point-based rendering algorithm is used to render a point model comprising a combination of points and having a 3D shape by generating a planar splat such as a square or circle in each of the points on which the point model is projected, unlike a polygon-based rendering algorithm of appropriately combining a plurality of polygons.

When the splatting algorithm is used to determine a color of a pixel, the image quality is improved, but the 3D graphic data is processed more slowly. Further, if filtering is used to improve the image quality, the 3D graphic data is processed more slowly than before. However, fast rendering is required to perform a navigation operation in which a camera or a point of view may move.

SUMMARY

One or more embodiments of the present invention provide a rendering method, medium and apparatus for quickly projecting 3D graphic data to a 2D screen using point interpolation.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a rendering method using point interpolation including projecting 3D points onto a 2D screen, calculating a diameter of each of the projected points, generating rectilinear line segments having same lengths as the calculated diameters and a same color as the projected points, and interpolating the rectilinear line segments.

To achieve at least the above and/or other aspects and advantages, embodiments of the present invention include a rendering method using point interpolation including projecting 3D points onto a 2D screen, and interpolating the projected points.

To achieve at least the above and/or other aspects and advantages, embodiments of the present invention include a rendering apparatus using point interpolation. The apparatus includes a projector to project 3D points onto a 2D screen, a diameter calculator to calculate a diameter of each of the projected 3D points, a rectilinear line segment generator to generate rectilinear line segments having same lengths as the calculated diameters and a same color as the projected points, and an interpolator to interpolate the rectilinear line segments.

To achieve at least the above and/or other aspects and advantages, embodiments of the present invention include a rendering apparatus using point interpolation. The apparatus includes a projector to project 3D points onto a 2D screen, and an interpolator to interpolate the projected points.

To achieve at least the above and/or other aspects and advantages, embodiments of the present invention include a display including a screen, and points interpolated from 3D points projected onto the screen.

BRIEF DESCRIPTION OF THE DRAWINGS

The patent or application file contains at least one drawing executed in color. Copies of this patent or patent application publication with color drawings will be provided by the Office upon request and payment of the necessary fee. These and/or other aspects and advantages of the invention will become apparent and more readily appreciated from the following description of embodiments, taken in conjunction with the accompanying drawings of which:

FIGS. 6A through 8B explain a rendering method and apparatus using point interpolation, according to an embodiment of the present invention;

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
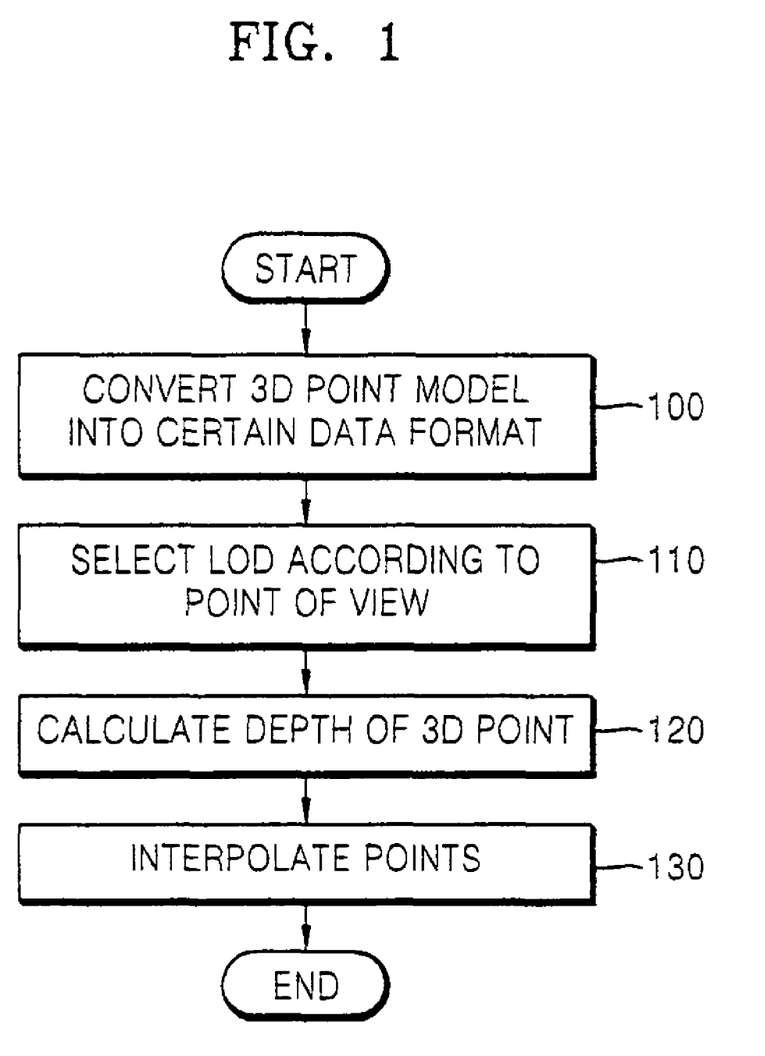
FIG. 1 illustrates a rendering method using point interpolation, according to an embodiment of the present invention.

FIG. 1 illustrates a rendering method using point interpolation, according to an embodiment of the present invention. Referring to FIG. 1, a 3D point model illustrated in FIG. 6A may be converted into a certain data format, in Operation 100. The 3D point model may include a combination of points referred to as image points, for example. An image point may include 3D data so that the 3D point model has a 3D shape.

The image point may have various data formats, e.g., a simple texture (ST) data format, a point cloud (PC) data format, or other formats. The ST format generally expresses data of the image point as color information and depth information. The depth information may indicate information on distances between a point of view and each of the image points. The PC format may express data of the image points as color information and geometrical information indicating the locations of each of the image points.

A level of detail (LOD) may be selected from previously set LODs, in Operation 110. An available resolution of each of the image points may be selected from several resolutions. The resolution of each of the image points may be be selected according to the depth of each of the image points, e.g., as defined above. For example, the resolution may be set as LOD 1>LOD 2>LOD 3>LOD 4 and one of LODs 1 through 4 may be selected according to the depth of each of the image points.

The depth of each 3D image point may then be calculated in Operation 120 and the points may be interpolated in Operation 130. Signals produced by interpolating the points may be input to a display apparatus such as a liquid panel, and may be expressed as illustrated in FIG. 6B, for example.

Figure 2A:
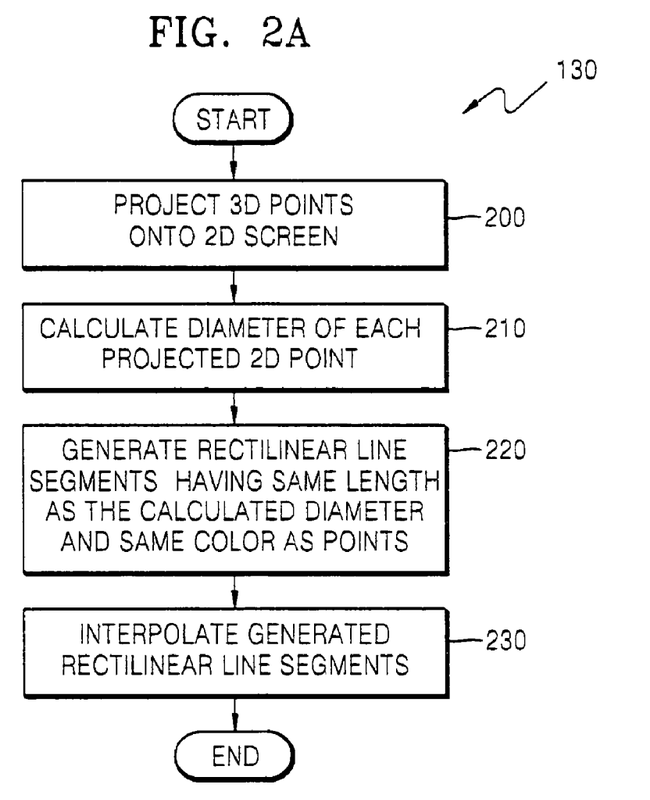
FIG. 2A illustrates Operation 130 illustrated in FIG. 1, according to an embodiment of the present invention.
Figure 9A:
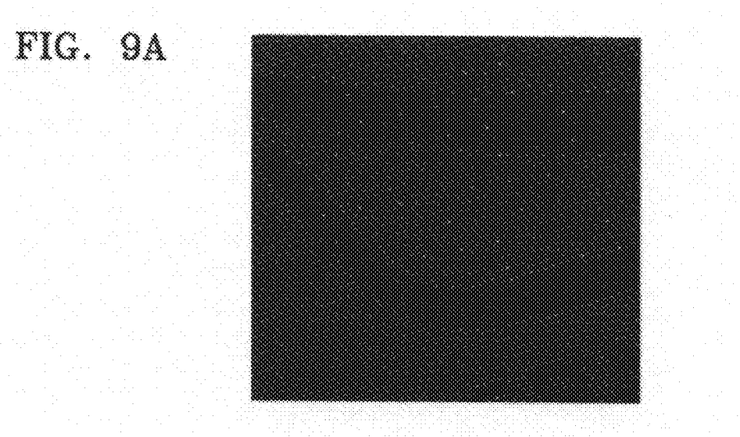
FIG. 9A illustrates 3D points projected on a 2D screen in Operation 200, according to an embodiment of the present invention.
Figure 10A:
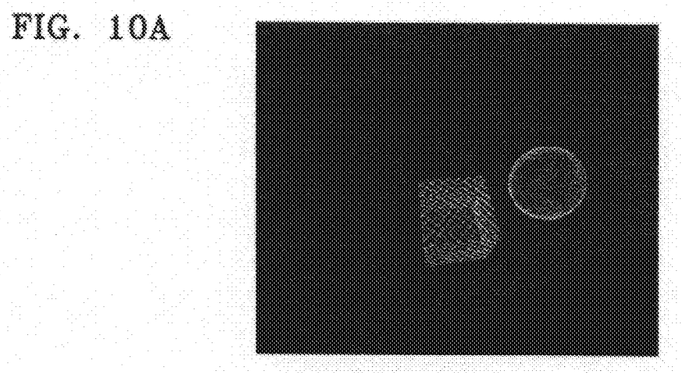
FIG. 10A illustrates 3D points projected on a 2D screen in Operation 200 according to an embodiment of the present invention.

FIG. 2A is a flowchart of Operation 130 illustrated in FIG. 1 according to an embodiment of the present invention. Referring to FIG. 2A, 3D points may be projected on a 2D screen in Operation 200, as illustrated in FIGS. 9A and 10A.

A diameter of each of the projected 2D points may be calculated, in Operation 210. The diameter of each of the 2D points may be a distance, excluding an empty space, between the 2D points. A rectilinear line segment having the same length as the diameter calculated in Operation 210 and the same color as the 2D point may be generated in Operation 220. The rectilinear line segment may be perpendicular to the 2D screen. The generated rectilinear line segments may then be interpolated, in Operation 230.

The rectilinear line segment may be located, for example, within the center of each of the 2D points.

Figure 7A:
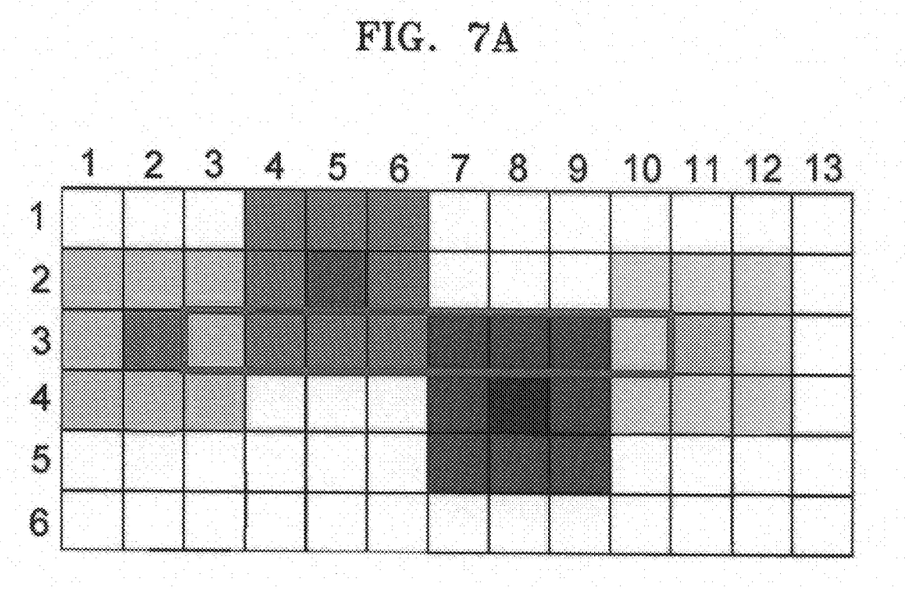
Figure 9B:
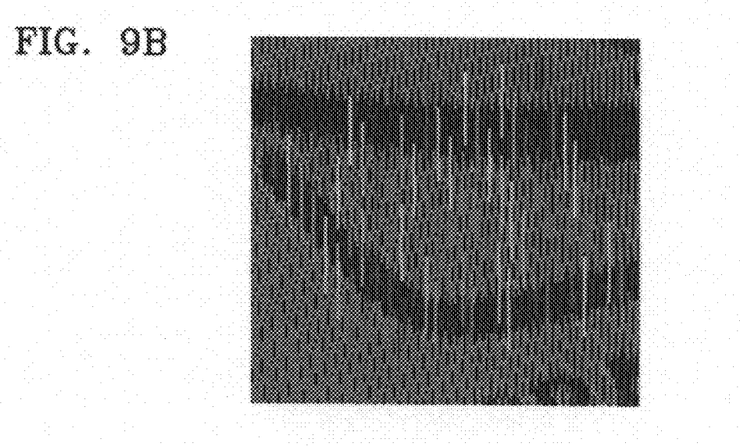
FIG. 9B illustrates a result obtained by performing Operation 220 on the 3D points projected onto the 2D screen illustrated in FIG. 9A, according to an embodiment of the present invention.
Figure 10B:
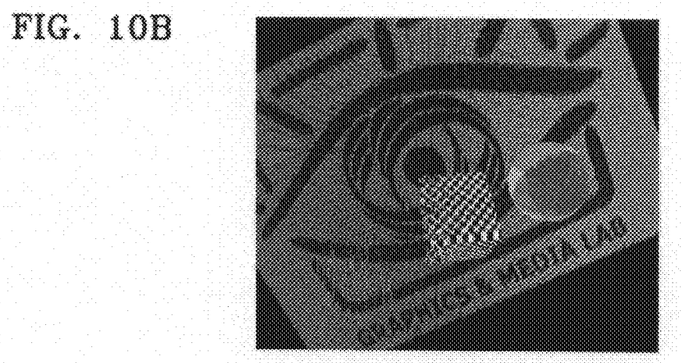
FIG. 10B illustrates a result obtained by performing Operation 220 on the 3D points projected onto the 2D screen illustrated in FIG. 10A, according to an embodiment of the present invention.

For example, referring to FIG. 7A, a rectilinear line segment may include four 2D points (3, 2), (2, 5), (4, 8), and (3, 11) projected onto the 2D screen, in Operation 200. With regard to Operation 220, a rectilinear line segment may include three 2D points (2, 2), (3, 2), and (4, 2), having as a center the 2D point (3, 2). A rectilinear line segment may include three 2D points (1, 5), (2, 5), and (3, 5), having as a center the 2D point (2, 5). A rectilinear line segment may include three 2D points (3, 8), (4, 8), and (5, 8), having as a center the 2D point (4, 8). A rectilinear line segment may include three 2D points (2, 11), (3, 11), and (4, 11), having as a center the 2D point (3, 11). FIGS. 9B and 10B are diagrams illustrating results obtained by performing Operation 220 using results obtained by performing Operation 200 as illustrated in FIGS. 9A and 10A.

Figure 7B:
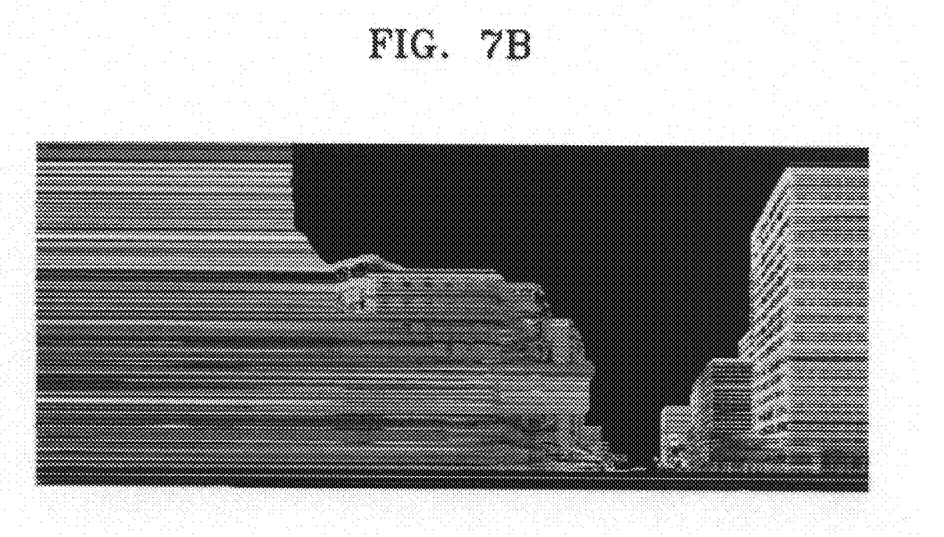
Figure 9C:
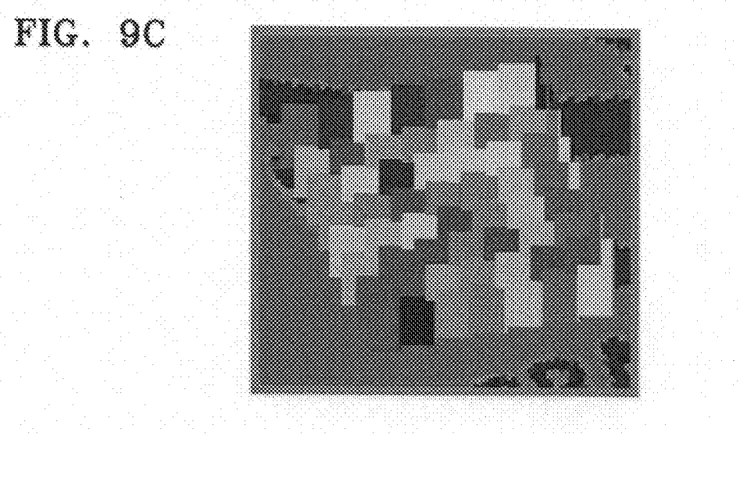
FIG. 9C illustrates a result obtained by performing Operation 230 on the result illustrated in FIG. 9B, according to an embodiment of the present invention.
Figure 10C:
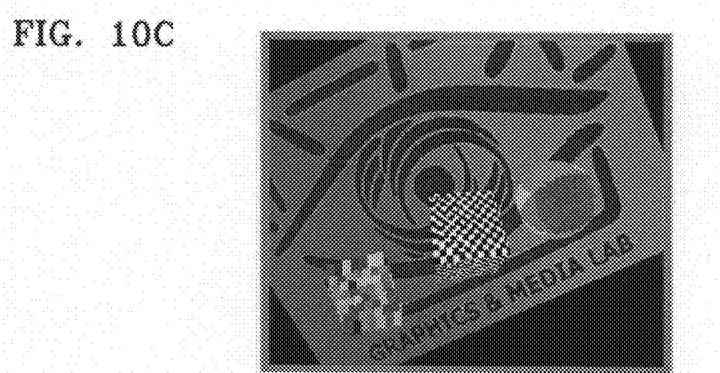
FIG. 10C illustrates a result obtained by performing Operation 230 on the result illustrated in FIG. 10B, according to an embodiment of the present invention.

The rectilinear line segments may be interpolated with a predetermined color, for example, illustrated in FIG. 7B, in Operation 230. Points where the rectilinear line segments cross a horizontal line of the 2D screen may be interpolated. For example, referring to FIG. 7A, 2D points (3, 2) and (3, 5) are interpolated, 2D points (3, 5) and (3, 8) are interpolated, and 2D points (3, 8) and (3, 11) are interpolated. FIGS. 9C and 10C are diagrams illustrating results obtained by performing Operation 230 on the results obtained by performing Operation 220 as illustrated in FIGS. 9B and 10B.

A method of interpolating the points used in Operation 230 will now be described.

The points may be interpolated so that a color between the points is changed from a color of a left point to a color of a right point. For example, if the left point is red and the right point is blue, both points may be interpolated so that a color between the both points is changed from red to blue, for example.

Then, points to the left of a certain point may be interpolated to a color of the left points, and points to the right of the certain point may be interpolated to a color of the right points. The certain point between the points may be determined according to a previously set ratio between both points. For example, if the previously set ratio is 50:50, points to the left of a center point may be interpolated to a color of the left points, and points to the right of the center point may be interpolated to a color of the right points.

Next, the points may be interpolated based on a color of a point to the left or right. For example, when the points are interpolated based on the color of the point to the left, if the left point is brown, the points may be interpolated to be brown.

An operation of erasing a splat, which is included in each object and is visualized, may be performed by splat adaptive filtering (SAF) on the points interpolated in Operation 230.

Figure 2B:
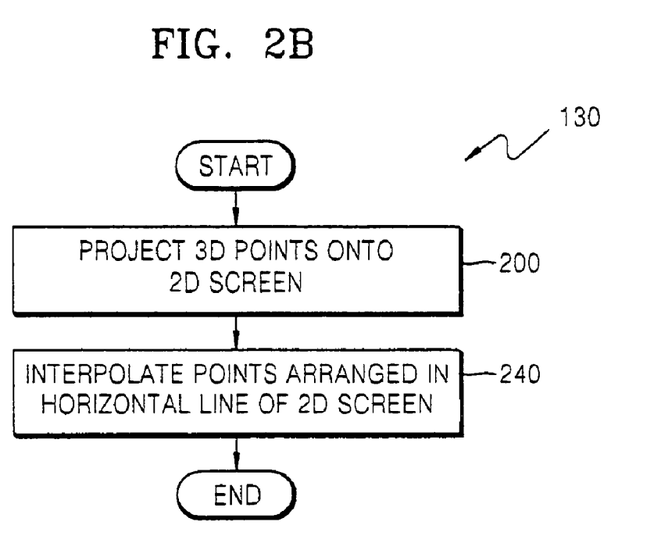
FIG. 2B illustrates Operation 130 illustrated in FIG. 1, according to an embodiment of the present invention.

FIG. 2B is a flowchart of Operation 130 illustrated in FIG. 1, according to an embodiment of the present invention. Referring to FIG. 2B, the 3D points may be projected onto the 2D screen, in Operation 200, as illustrated in FIGS. 9A and 10A.

Figure 8A:
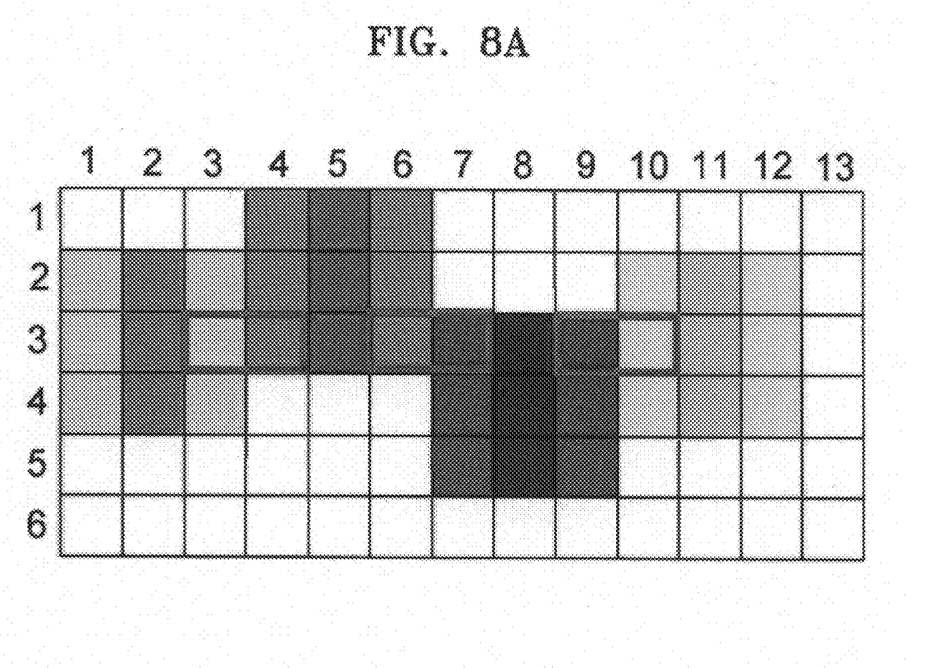
Figure 8B:
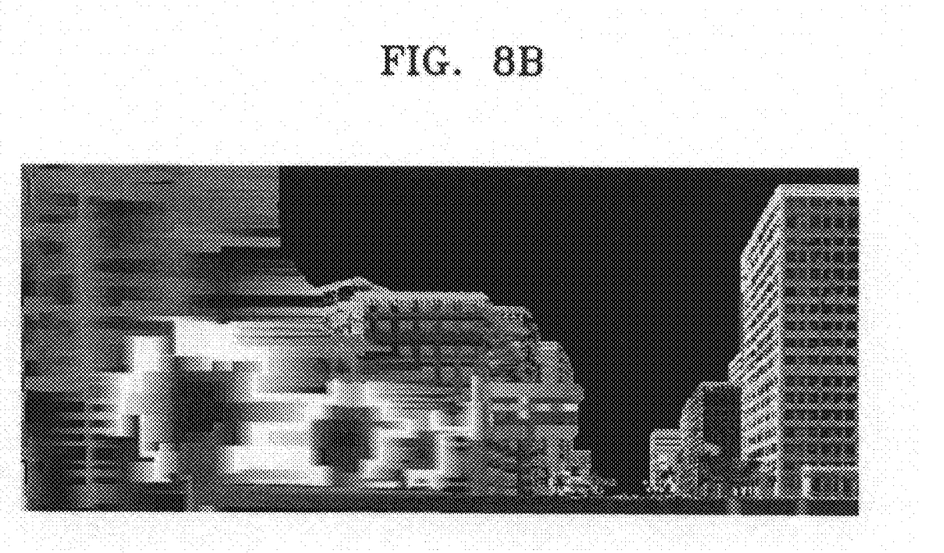

The projected 2D points may be interpolated, in Operation 240. The 2D points may be arranged in a horizontal line of the 2D screen. For example, referring to FIG. 8A, 2D points (3, 2) and (3, 11) may be projected on a third horizontal line. 2D points from (3, 3) through (3, 10) are interpolated in the same manner as in Operation 230 illustrated in FIG. 2A.

Figure 3:
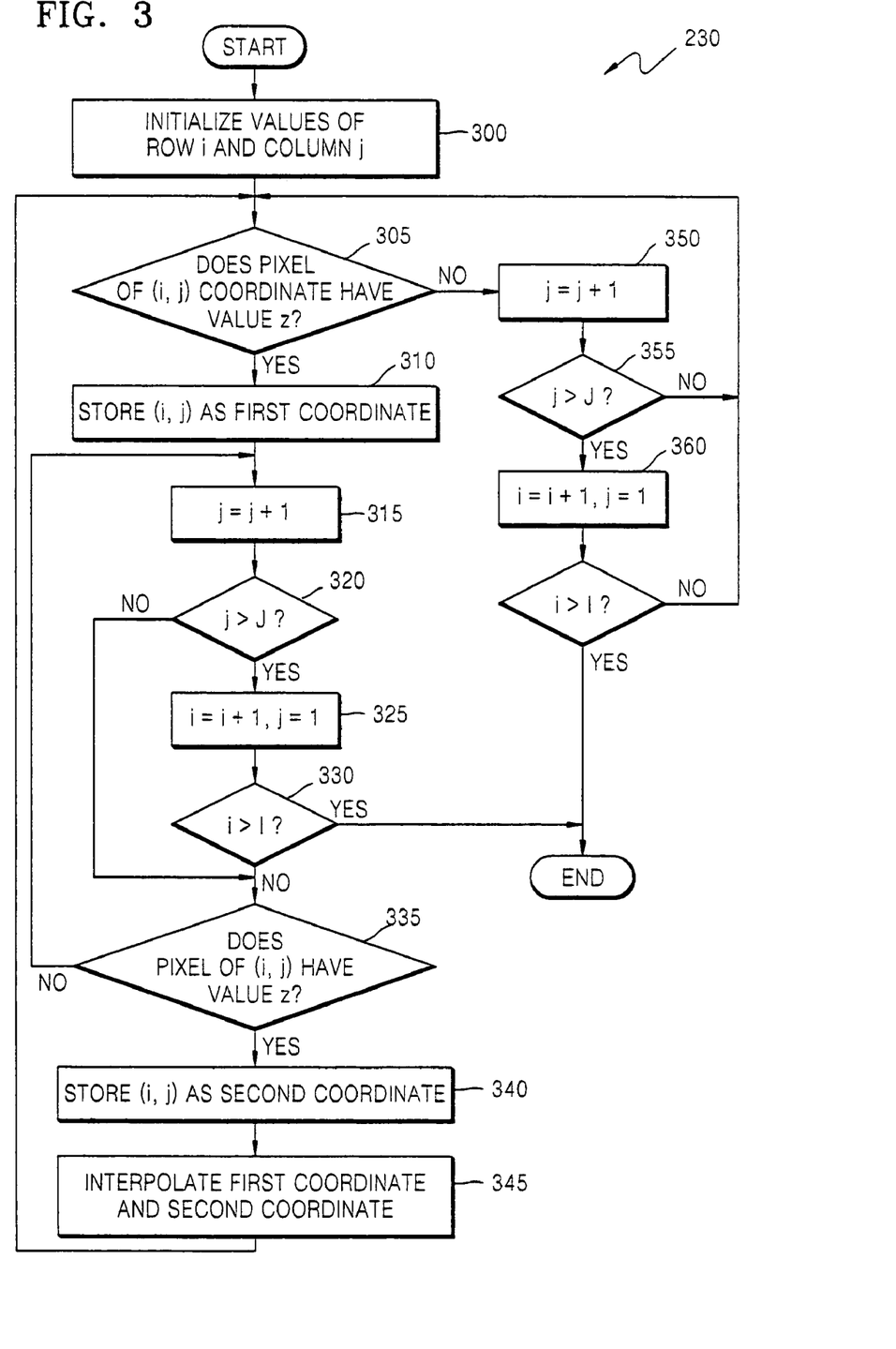
FIG. 3 illustrates point interpolation performed in Operation 130 illustrated in FIG. 1, according to an embodiment of the present invention.

FIG. 3 is a flowchart of point interpolation performed in Operation 130 illustrated in FIG. 1, according to an embodiment of the present invention. Referring to FIG. 3, values of a row i and a column j may be initialized, in Operation 300. The values may be set to 1, for example.

It may be determined whether a pixel (i, j) has a value z, in Operation 305. If it is determined that the pixel (i, j) has the value z, the pixel may correspond to a pixel of the 2D point on which the 3D point is projected in Operation 200, or to a pixel of the rectilinear line segment generated in Operation 220. A coordinate value of (i, j) may be stored as a first coordinate, in Operation 310.

A value 1 may be added to the value j, in Operation 315, and the value j may be compared to a threshold value J, in Operation 320. The threshold value J may be the number of pixels of a rectilinear line of the 2D screen, for example.

If it is determined that the value j is greater than the threshold value J, the value 1 may be added to the value i and the value j may be set to 1, in Operation 325.

The value i may be compared to a threshold value I, in Operation 330. The threshold value I may be the number of pixels of a horizontal line of the 2D screen.

If it is determined that the value j is smaller than the threshold value J, it may be determined whether the pixel (i, j) has the value z, in Operation 335.

If it is determined that the value j is greater than the threshold value J and that the value i is smaller than the threshold value I, Operation 335 may be performed.

If it is determined that the pixel (i, j) does not have the value z, Operation 315 may be performed.

If it is determined that the pixel (i, j) has the value z, the coordinate value of (i, j) may be stored as a second coordinate, in Operation 340.

A color between the first coordinate and the second coordinate may be interpolated in the same manner as in Operation 230, in Operation 345.

After Operation 345 is performed, if it is determined that a pixel of the second coordinate has the value z in Operation 305, Operations 310 and 315 may be performed.

If it is determined that the pixel (i, i) does not have the value z in Operation 305, 1 is added to the value j, in Operation 350, and the value j may be compared to the threshold value J, in Operation 355.

If it is determined that the value j is smaller than the threshold value J, it may be determined whether the pixel (i, i) has the value z, in Operation 305.

If it is determined that the value j is greater than the threshold value J, 1 may be added to the value i, and the value j may be set to 1 in Operation 360.

If it is determined that the value i is smaller than the threshold value I, Operation 305 may be performed.

Figure 4:
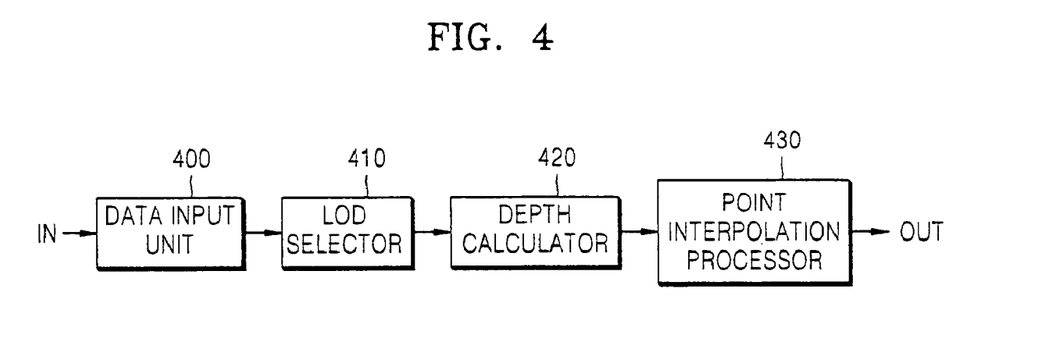
FIG. 4 illustrates a rendering apparatus using point interpolation, according to an embodiment of the present invention.

FIG. 4 is a block diagram of a rendering apparatus using point interpolation, according to an embodiment of the present invention. Referring to FIG. 4, the rendering apparatus may comprise a data input unit 400, an LOD selector 410, a depth calculator 420, and a point interpolation processor 430, for example.

Figure 6A:
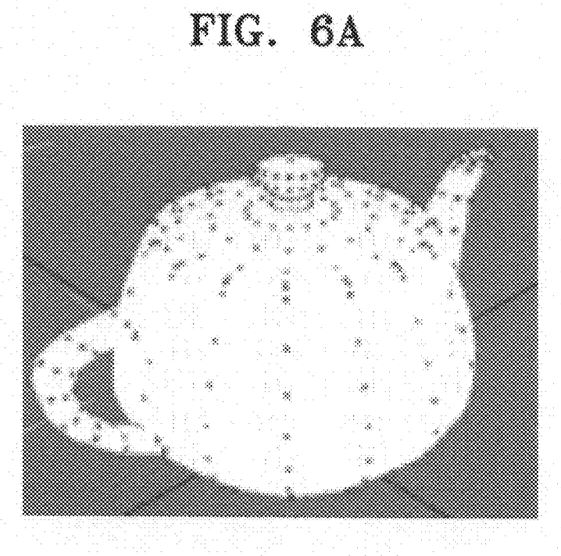
Figure 6B:
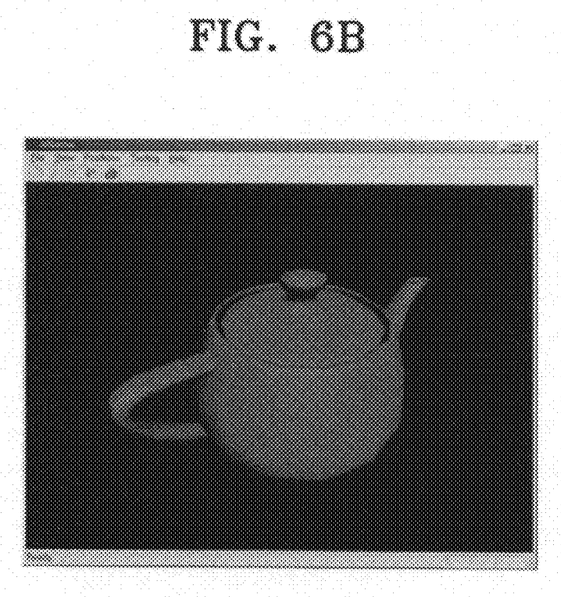

The data input unit 400 may receive, for example, the 3D point model illustrated in FIG. 6A via an input terminal IN. The 3D point model may include a combination of points. Points making up the 3D point model refer to image points. An image point may include 3D data so that the 3D point model has a 3D shape.

The image point may have various data formats e.g., a ST data format, a PC data format, and other formats. The ST format may express data of the image point as color information and depth information. The depth information may indicate information on distances between a point of view and each of the image points. The PC format may express data of the image points as color information and geometry information indicating the locations of each of the image points.

The LOD selector 410 may select an LOD from previously set LODs. That is, the LOD selector 410 may select an available resolution of each of the image points from several possible resolutions. The LOD selector 410 may select the resolution of each of the image points based on the depth of each of the image points. The depth of each of the image points may indicate a distance between the point of view and each of the image points. For example, the LOD selector 410 may set the resolution as LOD 1>LOD 2>LOD 3>LOD 4 and select one of LODs 1 through 4 according to the depth of each of the image points.

The depth calculator 420 may calculate the depth of each 3D image point.

The point interpolation processor 430 may interpolate points and output signals through an output terminal OUT.

The signals produced by the point interpolator processor 430 may be input to a display apparatus such as a liquid panel and may be expressed as illustrated in FIG. 6B.

Figure 5:
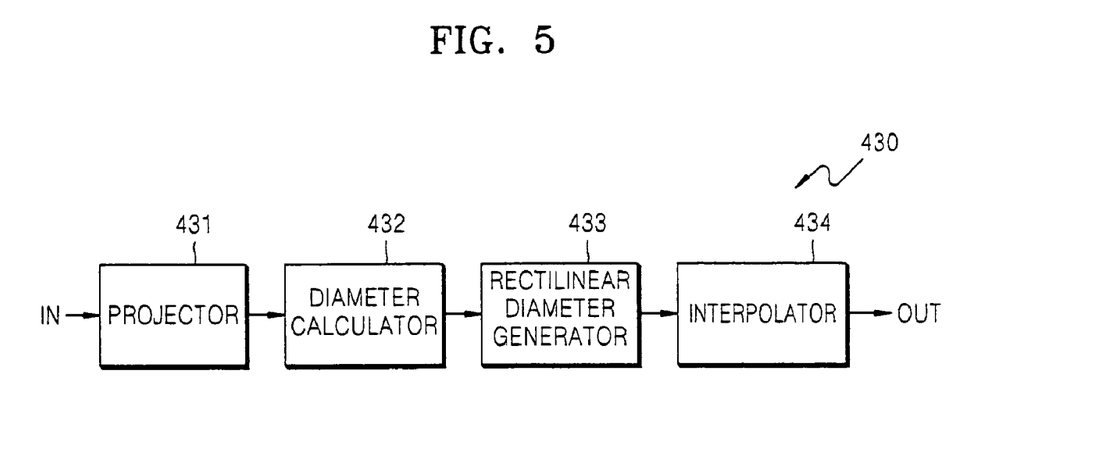
FIG. 5 illustrates a point interpolation processor illustrated in FIG. 4.

FIG. 5 is a block diagram of the point interpolation processor 430 illustrated in FIG. 4. Referring to FIG. 5, the point interpolation processor 430 may include, for example, a projector 431, a diameter calculator 432, a rectilinear diameter generator 433, and an interpolator 434.

The projector 431 may project 3D points on a 2D screen as illustrated in FIGS. 9A and 10A.

The diameter calculator 432 may calculate the diameter of each of the 2D points projected by the projector 431. The diameter of each of the 2D points may be a distance excluding an empty space between points. The points may then be interpolated by the interpolator 434.

The rectilinear diameter generator 433 may generate a rectilinear line segment having the same length as the diameter calculated by the diameter calculator 432 and the same color as the 2D point. The rectilinear line segment may be a line segment perpendicular to the 2D screen. The rectilinear line segment generated by the rectilinear diameter generator 433 may be located with the center of each of the 2D points.

For example, referring to FIG. 7A, the projector 431 may project four 2D points (3, 2), (2, 5), (4, 8), and (3, 11) on the 2D screen. The rectilinear diameter generator 433 may generate a rectilinear line segment including three 2D points (2, 2), (3, 2), and (4, 2) having as a center the 2D point (3, 2), a rectilinear line segment including three 2D points (1, 5), (2, 5), and (3, 5) having as a center the 2D point (2, 5), a rectilinear line segment including three 2D points (3, 8), (4, 8), and (5, 8) having as a center the 2D point (4, 8), and a rectilinear line segment including three 2D points (2, 11), (3, 11), and (4, 11) having as a center the 2D point (3, 11). FIGS. 9B and 10B are diagrams illustrating results performed by the rectilinear diameter generator 433 with regard to results performed by the projector 431.

The interpolator 434 may interpolate the rectilinear line segments generated by the rectilinear diameter generator 433 to a certain color illustrated in FIG. 7B. The interpolator 434 may interpolate points where the rectilinear line segments cross a horizontal line of the 2D screen. For example, referring to FIG. 7A, the interpolator 434 may interpolate 2D points (3, 2) and (3, 5), 2D points (3, 5) and (3, 8), and 2D points (3, 8) and (3, 11). FIGS. 9C and 10C are diagrams illustrating results performed by the interpolator 434 with regard to the results performed by the rectilinear diameter generator 433 as illustrated in FIGS. 9B and 10B.

A method of interpolating the points using the interpolator 434 will now be described.

The points may be interpolated so that a color between the points is changed from a color of a left point to a color of a right point. For example, if the left point is red and the right point is blue, both points may be interpolated so that a color between the both points is changed from red to blue.

Then, the points to the left of a certain point may be interpolated to a color of the left points, and the points to the right of the certain point may be interpolated to a color of the right points. The certain point between the points may be determined according to a previously set ratio between both points. For example, if the previously set ratio is 50:50, points to the left of a center point are interpolated to a color of the left points, and points to the right of the center point interpolated to a color of the right points.

Next, the points may be interpolated based on a color of a point to the left or right. For example, when the points are interpolated based on the color of the point to the left, if the left point is brown, the points are interpolated to brown.

Figure 9D:
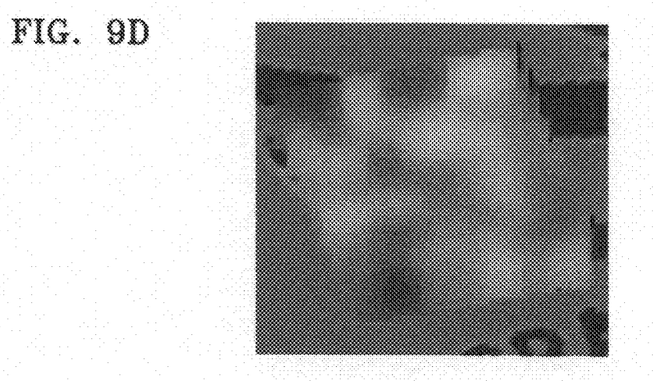
FIG. 9D illustrates a result obtained by performing splat adaptive filtering (SAF) to the result illustrated in FIG. 9C, according to an embodiment of the present invention.
Figure 10D:
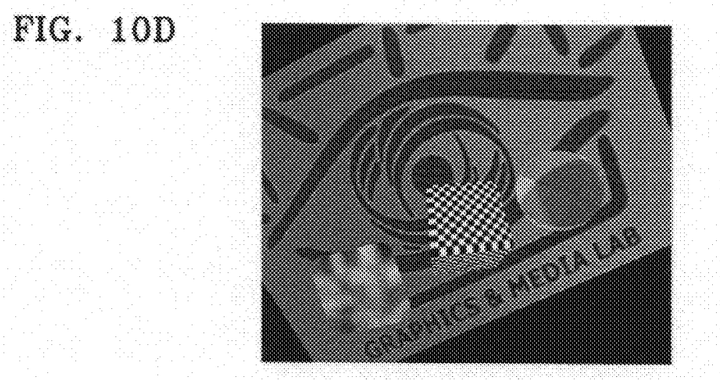
FIG. 10D illustrates a result obtained by performing SAF to the result illustrated in FIG. 10C, according to an embodiment of the present invention.

An operation of erasing a splat that is included in each object and is visualized may be performed by SAF on the points interpolated by the interpolator 434. FIGS. 9D and 10D illustrate results obtained by performing the SAF with regard to the results performed by the interpolator 434 as illustrated in FIGS. 9C and 10C. The point interpolation processor 430, as illustrated in FIG. 5, may interpolate the points without the rectilinear diameter generator 433.

The projector 431 may project the 3D points onto the 2D screen as illustrated in FIGS. 9A and 10A. According to another aspect of the present embodiment the rectilinear diameter generator 433 need not be included in the point interpolation processor 430. If the rectilinear diameter generator 433 is omitted, the interpolator 434 may interpolate the 2D points. The 2D points may be arranged in a horizontal line on the 2D screen. For example, referring to FIG. 8A, 2D points (3, 2) and (3, 11) are projected onto a third horizontal line. The interpolator 434 may interpolate a color between 2D points (3, 3) through (3, 10) in the same manner as described above.

In addition to this discussion, one or more embodiments of the present invention may also be implemented through such software as computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element may include a processor or a computer processor, and processing elements may be distributed and/or included in a single device.

The rendering method, medium and apparatus of the present invention may interpolate points and quickly render 3D graphic data as a 2D image.

Figure 11:
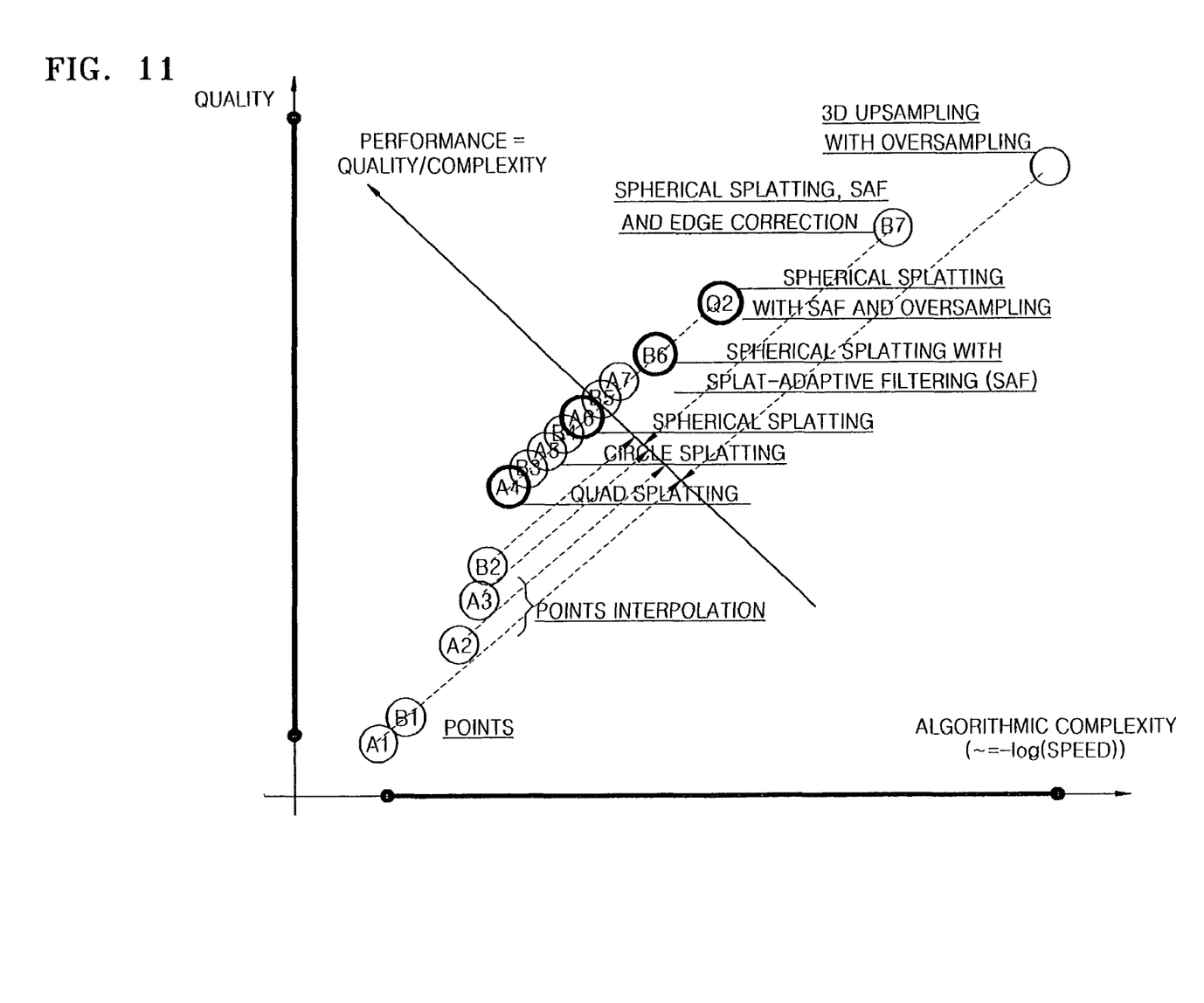
FIG. 11 is a graph illustrating the effect of the rendering method, medium and apparatus using point interpolation, according to an embodiment of the present invention.

The quality of the 2D image may be deteriorated but the 3D graphic data may still be quickly processed as illustrated in FIG. 11. Therefore, the present invention may be effectively used where faster processing is more important than image quality, e.g., in a navigation operation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rendering method using point interpolation comprising:
projecting, using a projector, 3D points onto a 2D screen;
calculating a diameter of each of the projected points;
generating rectilinear line segments having same lengths as the calculated diameters and a same color as the projected points; and
interpolating the rectilinear line segments.

2. The method of claim 1, wherein points where the rectilinear line segments cross a horizontal line on the 2D screen are interpolated.

3. The method of claim 2, wherein the points are interpolated so that the color of the points can be changed.

4. The method of claim 2, wherein the points are interpolated based on a color of a left point or a right point.

5. The method of claim 2, wherein points left of a certain point are interpolated to be a color of left points, and points right of the certain point are interpolated to be a color of right points.

6. The method of claim 1, wherein the diameter of each projected point corresponding to a length excluding an empty space between the interpolated points is calculated.

7. A rendering method using point interpolation comprising:
projecting, using a projector, 3D points onto a 2D screen; and
interpolating the projected points,
wherein a space between points arranged in an identical horizontal line among the projected points on the 2D screen are interpolated.

8. The method of claim 7, wherein the points are interpolated so that the color of the points can be changed.

9. The method of claim 7, wherein the points are interpolated based on a color of a left point or a right point.

10. The method of claim 7, wherein points left of a certain point are interpolated to be a color of left points, and points right of the certain point are interpolated to be a color of right points.

11. At least one storage medium comprising computer readable code to control at least one processing element to implement the method of any one of claims 1 through 7 and 8 through 10.

12. A rendering apparatus using point interpolation, comprising:
a projector to project 3D points onto a 2D screen;
a diameter calculator to calculate a diameter of each of the projected 3D points;
a rectilinear line segment generator to generate rectilinear line segments having same lengths as the calculated diameters and a same color as the projected points; and
an interpolator to interpolate the rectilinear line segments.

13. The apparatus of claim 12, wherein the interpolator interpolates points where the rectilinear line segments cross a horizontal line on the 2D screen.

14. The apparatus of claim 13, wherein the interpolator interpolates the points so that the color of the points can be changed.

15. The apparatus of claim 13, wherein the interpolator interpolates the points based on a color of a left point or a right point.

16. The apparatus of claim 13, wherein the interpolator interpolates points left of a certain point to be a color of left points, and points right of the certain point to be a color of right points.

17. The apparatus of claim 12, wherein the diameter calculator calculates the diameter of each projected point corresponding to a length excluding an empty space between the interpolated points.

18. A rendering apparatus using point interpolation comprising:
a projector to project 3D points onto a 2D screen; and
an interpolator to interpolate the projected points,
wherein a space between points arranged in an identical horizontal line among the projected points on the 2D screen are interpolated.

19. The apparatus of claim 18, wherein the interpolator interpolates the points so that a color of the points can be changed.

20. The apparatus of claim 18, wherein the interpolator interpolates the points based on a color of a left point or a right point.

21. The apparatus of claim 18, wherein the interpolator interpolates points left of a certain point to be a color of left points, and points right of the certain point to be a color of right points.

22. A display comprising:

a 2D screen; and points interpolated from 3D points projected onto the 2D screen, wherein a space between points arranged in an identical horizontal line among the projected points on the 2D screen are interpolated.

* * * * *